United States Patent [19]

Kikut

[11] 4,122,676
[45] Oct. 31, 1978

[54] APPARATUS FOR EXTRACTING ENERGY FROM WAVE MOTION

[76] Inventor: Edmundo Kikut, Avenida 8 Calles 5-7, San Jose, Costa Rica

[21] Appl. No.: 825,142

[22] Filed: Aug. 16, 1977

[51] Int. Cl.$^2$ .............................................. F16D 33/00
[52] U.S. Cl. ....................................... 60/398; 60/716; 405/76; 74/812; 290/53
[58] Field of Search ................. 60/398, 504, 505, 507, 60/716; 61/19, 20; 74/126, 136, 812; 185/33; 290/42, 43, 53, 54; 416/6, 84; 417/330, 334, 100

[56] References Cited

U.S. PATENT DOCUMENTS

| 353,797 | 12/1886 | Marshall | 74/812 X |
| 1,025,929 | 5/1912 | Snook | 416/6 |
| 1,544,725 | 7/1925 | Cleaveland | 417/330 |

Primary Examiner—Edgar W. Geoghegan

Attorney, Agent, or Firm—Larson, Taylor and Hinds

[57] ABSTRACT

An apparatus is provided for extracting energy from the motion of water waves during both the ebb and flow of such waves. The apparatus includes a screw propeller which is disposed to contact the waves and to be driven thereby in opposite directions depending on the direction of movement of the waves. A pair of ratchet wheel and pawl assemblies, mounted on a common drive shaft with the propeller, provide transmission of the rotational forces for both directions of rotation. A pair of force transmitting connections disposed between the drive shaft and a driven shaft provide rotation of the driven shaft in the same direction for both directions of rotation of the drive shaft. A plurality of such apparatus are preferably used to drive a single common shaft which serves as a drive shaft for an utilization device such as a dynamo.

5 Claims, 4 Drawing Figures

APPARATUS FOR EXTRACTING ENERGY FROM WAVE MOTION

FIELD OF THE INVENTION

The present invention relates to systems and apparatus for extracting energy from the motion of waves, i.e., to converting wave motion into useful energy.

BACKGROUND OF THE INVENTION

A number of different systems and apparatus have been devised for extracting energy from the wave motion of water although very few have proved to be really practical. Examples of patents disclosing what will be referred to here, for shorthand purposes, as "wave motors", include U.S. Pat. Nos. 523,963 (Gerlach); 1,200,308 (Bunnell); 1,831,097 (David) and 1,025,929 (Snook), although this listing is not, nor is it represented to be, exhaustive. Briefly considering these patents, the Gerlach patent discloses a wave motor including a single paddle attached by a pulley to a toothed wheel and employing a pulley and cross-pulley arrangement. The Bunnell patent, while discussing wave motors in general, is actually directed to a "water motor" employing oppositely directed scoops. The David patent discloses a wave motor device including oppositely directed blades which collapse in one direction so that waves in that direction will not affect the operation of the device.

The Snook patent is perhaps the most relevant of the patents listed above insofar as the present invention is concerned in view of the disclosure therein of a wave motor including helical screws or fins which, as stated in the patent, are arranged so that the movement of the waves of the ocean will rotate the same thereby producing movement that may be transmitted to other mechanisms. The wave motor disclosed in the Snook patent suffers a number of disadvantages. For example, the construction disclosed in the Snook patent does not take into account the substantially simultaneous ebb and flow of the waves adjacent to the shore and because of this, the helical blades or fins can be subjected to oppositely directed thrusts at any one time. Moreover, provision is made for directly connecting the separate axles or shafts upon which the helical fins are located to rigid gears which can cause the shafts to rotate in opposite directions and produce an unworkable result. Thus, while, as will become evident from the discussion of the present invention hereinafter, the device of the Snook patent is broadly similar in certain regards to that of the present invention, the Snook device suffers important disadvantages which render its use impractical.

SUMMARY OF THE INVENTION

In accordance with the present invention, a wave motor apparatus is provided for extracting energy from water waves which provides substantial advantages over the prior art. The apparatus of the invention is practical and effective and, in this present era of energy consciousness, enables a source of energy to be tapped which hitherto has been at best underutilized even where it has been exploited at all.

According to a preferred embodiment thereof, the invention comprises an apparatus for extracting energy from water wave motion, during both the ebb and flow of such waves, which includes a wave responsive drive unit comprising a screw propeller adapted to be disposed in the path of such waves and rotatable in opposite directions responsive to the ebb and flow of the waves, a drive shaft on which the propeller is mounted, first and second ratchet wheels rotatably mounted on the drive shaft at spaced locations therealong, first and second pawls respectively associated with said first and second ratchet wheels for respectively limiting the transmission of the rotation of the drive shaft to the opposite directions of rotation of the shaft produced by the ebb and flow of the waves, an output shaft, and first and second transmission means associated with the first ratchet wheel and said first pawl and with said second ratchet wheel and said second pawl, respectively, for converting the rotation of the drive shaft produced by each ratchet wheel and pawl combination into rotation of the output shaft in a single direction. With this arrangement, the motion of the waves in both directions, i.e., ebb and flow, is exploited while still providing a common unidirectional take-off.

The transmission means preferably comprises first and second drive wheels rotatably mounted on the drive shaft and secured to the first and second ratchet wheels, first and second driven wheels located on the output shaft, and V-belts interconnecting the drive wheels and the driven wheels.

Advantageously, the apparatus comprises a plurality of such drive units rotatably driving a common output shaft in the same direction of rotation, e.g., clockwise, the common shaft being connected to a utilization device located on land such as a dynamo.

Other features and advantages of the invention will be set forth in, or apparent from, the detailed description of the preferred embodiments found hereinbelow.

DESCRIPTION OF THE PREFERRED EMBODIMENTS

Figure 1:
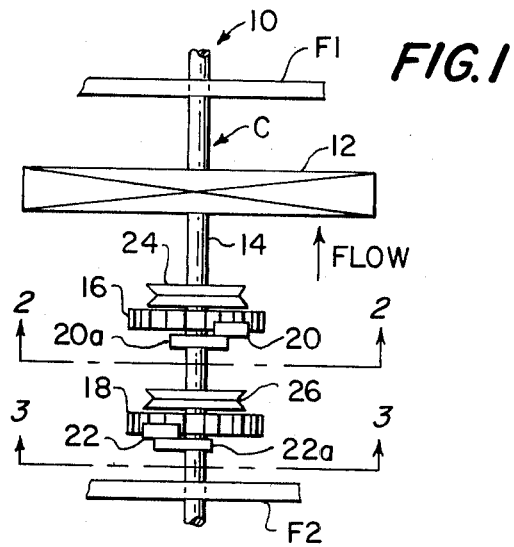
FIG. 1 is a top plan view, taken generally along line I—I of FIG. 2, of a wave motor apparatus constructed in accordance with the present invention.
Figure 2:
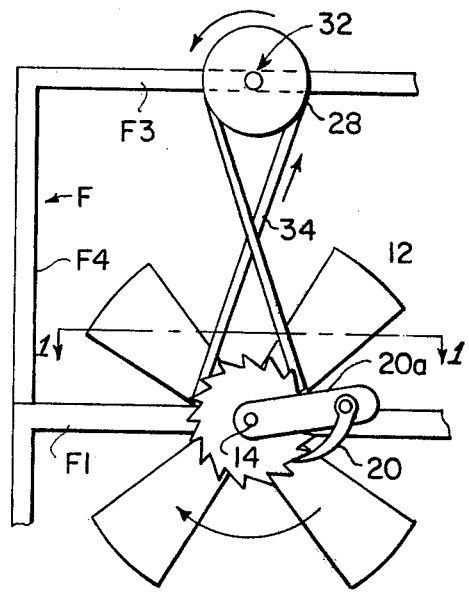
FIG. 2 is a transverse cross-sectional view of the apparatus of FIG. 1 taken generally along line II—II of FIG. 1.
Figure 3:
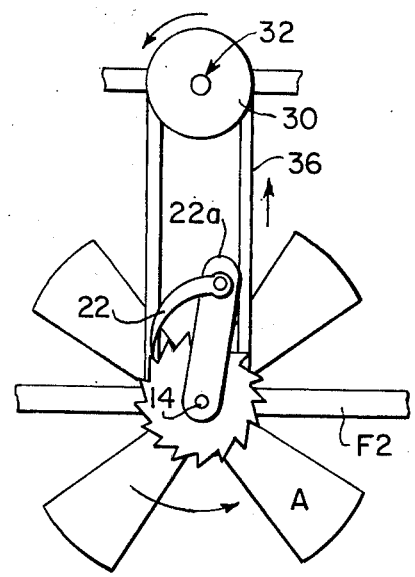
FIG. 3 is a transverse cross-sectional view of the apparatus of FIG. 1 taken generally along line III—III of FIG. 1, with portions being removed for the purposes of clarity.

Referring to the drawings and, in particular to FIGS. 1 to 3, the wave motor apparatus of the invention is generally denoted 10. The apparatus includes a screw-type propeller 12 which is fixedly mounted on a shaft 14 for rotation relative to a support or frame generally denoted F. Such a support can take a number of different forms and the support itself may be supported on suitable pilings or floats. In the illustrated embodiment, frame F includes a pair of transversely extending frame members F1 and F2 in which shaft 14 is journalled for rotation.

Also mounted on shaft 14 are a pair of ratchet wheels 16 and 18 which respectively cooperate with a pair of pawls 20 and 22 associated therewith. Ratchet wheels 16 and 18 are mounted for free rotation on shaft 14 while pawls 20 and 22 are pivotably mounted on support arms 20a and 22a which are affixed on shaft 14, pawls 20 and 22 engaging ratchet wheels 16 and 20 so as to limit transmission of the rotation of shaft 14 to a single direction, viz., clockwise for pawl 20 and counter-clockwise for pawl 22.

Pawl and rachet transmissions 16, 20 and 18, 22 each include an associated V-belt drive wheel 24 and 26, respectively. More specifically, drive wheels 24 and 26 are affixed to ratchet wheels 16 and 18, respectively, and are mounted to be freely rotatable about shaft 14. A pair of cooperating belt-driven wheels 28 and 30 are mounted on a further shaft 32 mounted directly above and extending parallel to shaft 14. Shaft 32 is illustrated as being supported by a transversely extending frame member F3 of frame F, transverse frame members F1, F2 and F3 all being supported in part by a vertically extending frame member indicated at F4. Again, it will be understood that the support construction for the apparatus of the invention which has been illustrated schematically in the drawings is merely exemplary and other suitable support arrangements can be readily adapted for this purpose. Referring to FIG. 2, a V-belt 34 extends between drive wheel 24 and driven wheel 28, belt 34 being crossed so that the clockwise rotation of shaft 14 is converted into a counterclockwise rotation of driven wheel 28 and hence of shaft 32. Similarly, as shown in FIG. 3, a V-belt 36, which extends between drive wheel 26 and driven wheel 30 with the sides thereof parallel, produces counter-clockwise rotation of driven wheel 30 and hence of shaft 32. Thus, shaft 32 is rotated in the same direction regardless of the direction of rotation of shaft 14.

Figure 4:
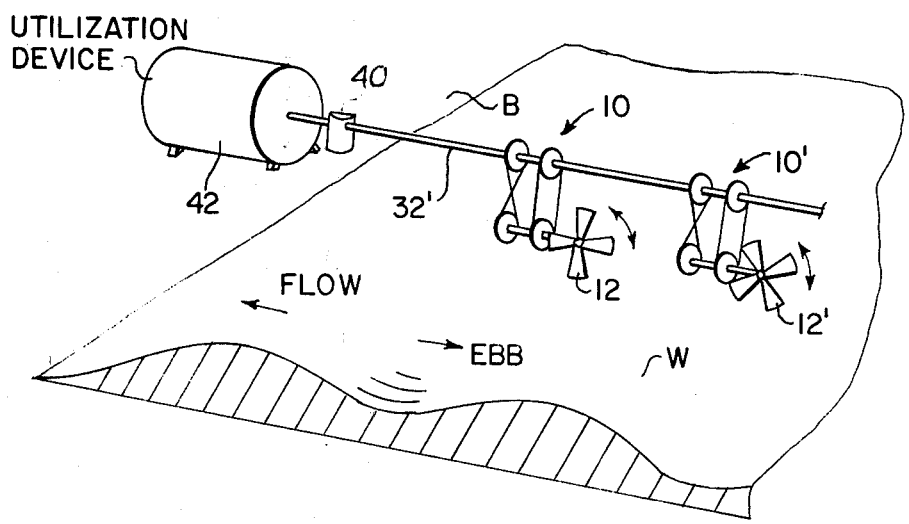
FIG. 4 is a highly schematic perspective view illustrating a system incorporating the wave motor apparatus of the invention.

The overall operation of the apparatus of the invention will be discussed with respect to FIG. 4. As illustrated, a plurality of the devices shown in FIGS. 1 to 3 are utilized, two of such devices, denoted 10 and 10', being shown in FIG. 4. Devices 10, 10' drive a common shaft 32', corresponding to shaft 32 of FIGS. 1 to 3, which is connected through a suitable union 40 to an utilization device 42, such as a generator, located on a beach B or the like adjacent to the water W. It will be appreciated that the rotational forces generated by shaft 32 can be utilized in a number of different ways and that, moreover, a take-off for these forces can be provided in a number of different ways. Considering the operation of the system of FIG. 4, screw-propellers 12 and 12' are disposed so as to contact the waves and thus to be driven thereby. The rotation of the propellers is converted by the transmission assemblies described above into rotation of shaft 32'. The provision of the particular transmission assemblies results in rotation of the output shaft 32 in the same direction regardless of whether propellers 12 and 12' are actuated by the flow or ebb of the waves since rotation in either direction of the propeller shafts corresponding to shaft 14 always produces rotation of output shaft 32' in the same direction. Thus, the system of the present invention takes full advantage of the forces associated with wave motion and smoothly and efficiently converts these forces into the rotation of a common output shaft.

Although the invention has been described relative to exemplary embodiments thereof, it will be understood that other variations and modifications can be effected in these embodiments without departing from the scope and spirit of the invention.

I claim:

1. Apparatus for extracting energy from the motion of water waves during both the ebb and flow of such waves, said apparatus including at least one wave responsive drive unit comprising:

a screw propeller adapted to be disposed in the path of such waves and rotatable in opposite directions responsive to the ebb and flow of the waves;

a drive shaft on which said propeller is mounted;

first and second ratchet wheels rotatably mounted on said shaft at spaced locations therealong;

first and second pawls respectively associated with said first and second ratchet wheels for respectively limiting the transmission of the rotation of said drive shaft to said opposite directions of rotation of the shaft produced by the ebb and flow of the waves;

an output shaft; and first and second transmission means associated with said first ratchet wheel and said first pawl and with said second ratchet wheel and said pawl, respectively, for converting the rotation of the drive shaft produced by each ratchet wheel and pawl combination into rotation of said output shaft in a single direction.

2. An apparatus as claimed in claim 1 wherein said transmission means comprises first and second drive wheels rotatably mounted on said drive shaft and secured to said first and second ratchet wheels; first and second driven wheels located on said output shaft; and V-belts interconnecting said drive wheels and said driven wheels.

3. An apparatus as claimed in claim 1 wherein said apparatus comprises a plurality of said drive units rotatably driving a common said output shaft in the same direction of rotation.

4. An apparatus as claimed in claim 3 wherein said common output shaft is connected to a utilization device, located on land, for utilizing the rotational forces of said common output shaft.

5. An apparatus as claimed in claim 2 wherein said pawls are pivotably mounted on support arms affixed to said drive shaft.

* * * * *